(12) United States Patent
Sun et al.

(10) Patent No.: US 9,243,551 B2
(45) Date of Patent: *Jan. 26, 2016

(54) CONTROL STRATEGY FOR DECREASING RESONANCE IN A TURBOCHARGER

(75) Inventors: Harold Huimin Sun, West Bloomfield, MI (US); Yong Shu, Northville, MI (US); Dave Hanna, Troy, MI (US); Tim Schram, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 295 days.

This patent is subject to a terminal disclaimer.

(21) Appl. No.: 13/612,617

(22) Filed: Sep. 12, 2012

(65) Prior Publication Data

US 2013/0004292 A1    Jan. 3, 2013

Related U.S. Application Data

(63) Continuation of application No. 12/511,551, filed on Jul. 29, 2009, now Pat. No. 8,312,718.

(51) Int. Cl.
| | | |
|---|---|---|
| *F02D 23/00* | (2006.01) | |
| *F02B 33/44* | (2006.01) | |
| *F02M 25/07* | (2006.01) | |
| *F02B 37/18* | (2006.01) | |
| *F02B 37/24* | (2006.01) | |
| *F02B 37/12* | (2006.01) | |

(52) U.S. Cl.
CPC ................ *F02B 37/18* (2013.01); *F02B 37/24* (2013.01); *F02B 2037/122* (2013.01); *Y02T 10/144* (2013.01)

(58) Field of Classification Search
CPC ........ F02B 37/18; F02B 37/24; F02B 37/186; F02B 37/22; F02D 41/0007; F02D 23/00; F02M 25/0707; F02M 25/0709
USPC ..................... 60/602, 605.1, 605.2, 611, 600; 415/119; 701/106, 108
See application file for complete search history.

(56) References Cited

U.S. PATENT DOCUMENTS

| | | | |
|---|---|---|---|
| 3,893,107 A | 7/1975 | Schedler | |
| 4,817,387 A | 4/1989 | Lashbrook | |
| 6,560,963 B2 | 5/2003 | Cornell et al. | |
| 6,889,502 B1 * | 5/2005 | French ................ | F02D 41/0007 60/601 |

(Continued)

FOREIGN PATENT DOCUMENTS

| | | | | |
|---|---|---|---|---|
| EP | 1323927 A1 * | 7/2003 | .............. | F04D 27/00 |
| WO | WO 2008144307 A1 * | 11/2008 | .............. | F02B 37/24 |

*Primary Examiner* — Thai Ba Trieu
*Assistant Examiner* — Jason T Newton
(74) *Attorney, Agent, or Firm* — Julia Voutyras; Alleman Hall McCoy Russell & Tuttle LLP (57) ABSTRACT

A method for operation of an engine including a turbocharger system is provided. The method includes adjusting turbocharger rotational acceleration or deceleration in response to one or more resonant frequencies. Additionally in some examples, the method may further include increasing turbocharger rotation in response to one or more resonant frequencies during a first condition, and increasing turbocharger deceleration in response to one or more resonant frequencies during a second condition, the second condition different from the first condition. In this way, it is possible to enhance the useful life cycle of the turbocharger and associated engine by limiting the operating time in a resonant frequency band.

8 Claims, 3 Drawing Sheets

(56) References Cited

U.S. PATENT DOCUMENTS

| | | |
|---|---|---|
| 7,016,779 B2 | 3/2006 | Bowyer |
| 7,059,820 B2 * | 6/2006 | Hosny .................. F02B 37/12 60/602 |
| 7,127,892 B2 | 10/2006 | Akins et al. |
| 7,150,152 B2 * | 12/2006 | Kilkenny et al. ............... 60/612 |
| 7,509,803 B2 | 3/2009 | Panciroli |
| 8,006,494 B2 | 8/2011 | Nagae |
| 2001/0022084 A1 | 9/2001 | Koelle et al. |
| 2004/0011340 A1 * | 1/2004 | Hosny et al. ............... 123/559.1 |
| 2006/0005540 A1 | 1/2006 | Baize et al. |
| 2006/0064231 A1 | 3/2006 | Fekete et al. |
| 2007/0151241 A1 | 7/2007 | Arnold |
| 2008/0022679 A1 | 1/2008 | Hara et al. |
| 2008/0060356 A1 | 3/2008 | Livshiz et al. |
| 2010/0172741 A1 | 7/2010 | Hosoya et al. |
| 2010/0300088 A1 * | 12/2010 | Joergl et al. ..................... 60/602 |
| 2011/0023467 A1 * | 2/2011 | Kong ................... F02D 41/029 60/287 |
| 2012/0137675 A1 * | 6/2012 | Ito ................................ 60/602 |

\* cited by examiner

CONTROL STRATEGY FOR DECREASING RESONANCE IN A TURBOCHARGER

CROSS REFERENCE TO RELATED APPLICATIONS

The present application is a continuation of U.S. patent application Ser. No. 12/511,551 filed Jul. 29, 2009 now U.S. Pat. No. 8,312,718, the entire contents of which are incorporated herein by reference for all purposes.

BACKGROUND AND SUMMARY

Turbocharger systems can significantly increase the power output and efficiency of an internal combustion engine without significantly increasing the weight of the engine. Various turbocharger systems have been designed to provide boost to the engine over a range of operating conditions, most of these are well known in the industry. However, under certain operating conditions, such as an over-speed condition, the turbocharger may degrade and even fail due to the excessive stresses placed on various components in the turbocharger, such as the compressor and turbine blades, when the turbocharger speed has exceeded a threshold value.

In U.S. 2006/0005540, the speed of a turbocharger is limited in an attempt to avoid turbocharger over-speed conditions, thereby reducing wear on the turbocharger as well as the likelihood of turbocharger failure. In particular, the rotational speed of the turbocharger may be limited based on combinations of pressure, temperature, and other operating conditions at the inlet of the compressor. Other attempts have been made to increase the size and therefore strength of the compressor or turbine blades to avoid degradation and possible failure of the turbocharger.

However, there may be other operating conditions during which the turbocharger system may experience high stress, resulting in degradation of the turbocharger. For example, the turbocharger system may have various resonant frequencies corresponding to the vibrational characteristics of the system. The resonant frequencies may be within the range of turbocharger operation, thereby driving unwanted oscillations having undesired amplitudes within the turbocharger. It may be difficult to provide dampening within the turbocharger system without decreasing the turbocharger's performance, reliability, and/or durability. Furthermore, when the size of the turbine or compressor blades are increased the efficiency and transient response of the turbocharger may be decreased.

A method for operation of an engine including a turbocharger system is provided. The method includes adjusting turbocharger rotational acceleration or deceleration in response to one or more known resonant frequencies. Additionally in some examples, the method may further include increasing turbocharger rotation speed in response to one or more resonant frequencies during a first condition, and increasing turbocharger deceleration in response to one or more resonant frequencies during a second condition, the second condition different from the first condition. In this way, the operating interval within one or more resonant frequency bands may be reduced thereby decreasing the oscillations within the turbocharger, decreasing the stress experienced by the turbocharger's components and therefore increasing the longevity of the turbocharger.

It should be understood that the background and summary above is provided to introduce in simplified form a selection of concepts that are further laid out in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION OF THE INVENTION

Figure 1:
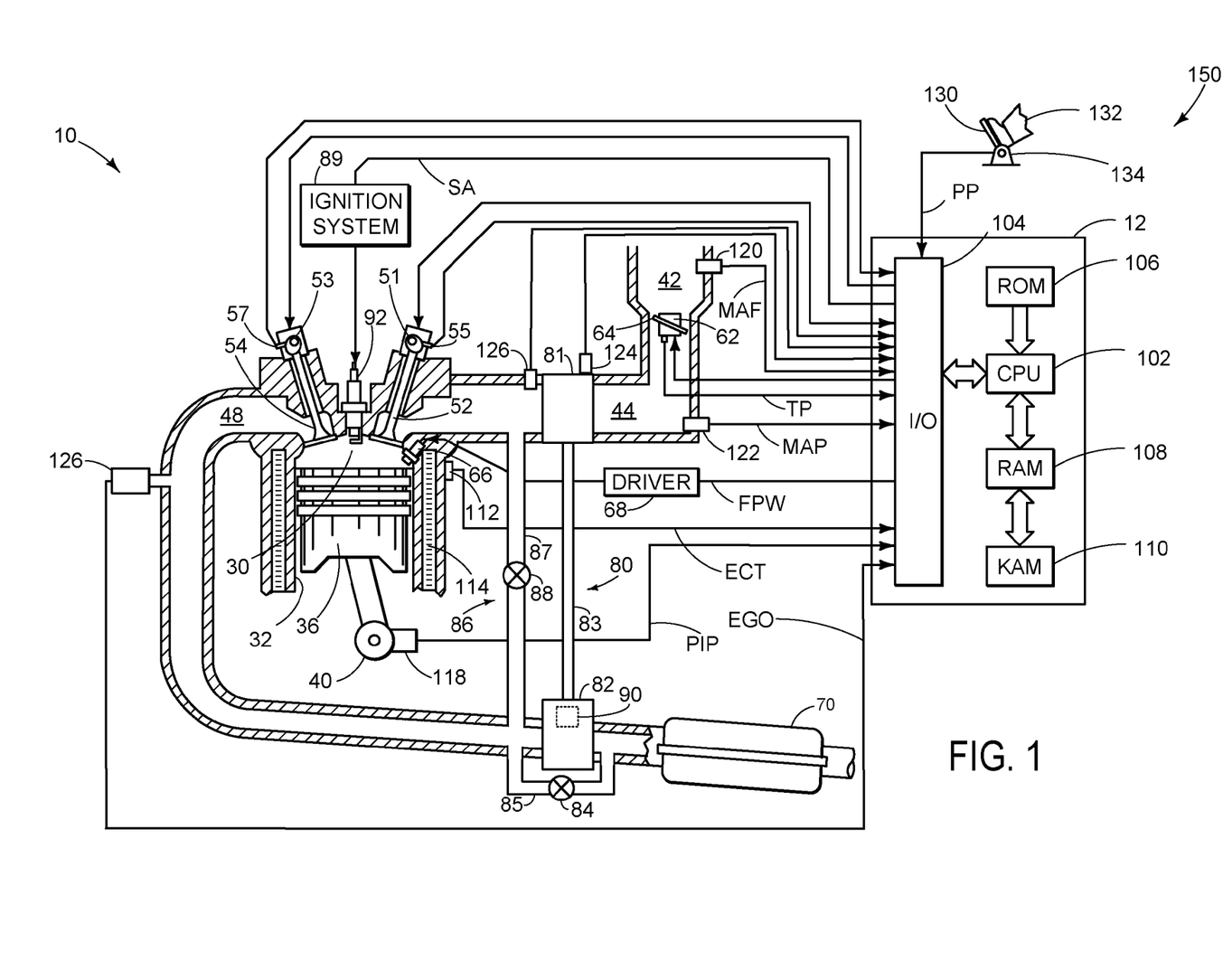
FIG. 1 is a schematic diagram of an engine system including a turbocharger system.

FIG. 1 shows a schematic diagram showing one cylinder of a single or multi-cylinder engine 10. Engine 10 may be controlled at least partially by a control system 150 including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

The engine may further include a turbocharger system 80. The turbocharger system may include at least one compressor 81 coupled to at least one turbine 82 via a drive-shaft 83. Compressor 81 may be positioned within an intake manifold 44 and the turbine 82 may be positioned within an exhaust passage 48. The turbine may be driven by exhaust gases from the engine, thereby driving the compressor via the driveshaft. It will be appreciated that alternate turbocharger configurations may be used in other examples. Suitable turbocharger configurations may include a twin-turbocharger, such as a parallel or a sequential twin-turbo arrangement.

A wastegate 84 may be positioned in a bypass conduit 85 coupled upstream and downstream of turbine 82 in exhaust passage 48. The wastegate may control the amount of exhaust gas provided to the turbine thereby adjusting the rotational speed of the turbocharger. It will be appreciated that in other examples, a wastegate may not be included in the turbocharger system.

The compressor may be configured to compress intake air delivered to the cylinder, thereby providing boost to the engine.

In some examples, turbine 82 may be a variable geometry turbine configured to adjust the geometry (e.g. turbine inducer flow area or nozzle angle) of the turbine based on vehicle operating conditions. In this way, boost may be provided to the engine over a wide range operating conditions (e.g. engine speeds, loads, etc.), increasing the vehicle's performance. The variable geometry turbine may include an actuator 90 (e.g. membrane actuator, electric servo actuator) configured to adjust the geometry of the turbine. Suitable variable geometry turbines include an adjustable vane turbine and an adjustable nozzle turbine. If a variable geometry turbine is utilized wastegate 84 and bypass conduit 85 may not be included in engine 10 or visa-versa, in some examples. However, in other examples a fixed geometry turbine may be utilized. When a fixed geometry turbine is utilized, the wastegate (i.e. turbine bypass valve) configured to adjust the turbo speed through a turbine bypass conduit coupled upstream and downstream of the turbine may also be included in the turbocharger system. However, in other examples, both a wastegate and variable geometry turbine may be included in the turbocharger system. However, in other examples, just the wastegate or the variable geometry turbine may be included in the turbocharger system and a fixed or variable geometry compressor may be utilized. It will be appreciated that the turbocharger system may be operated to provide varying levels at boost during various operating conditions. For example, the geometry of the turbine and/or the exhaust gas provided to the turbine may be adjusted to alter the amount of boost provided by the turbocharger system.

Moreover, the turbocharger system may have a plurality of fundamental frequencies, the fundamental frequencies corresponding to the modes of vibration of the turbocharger. For example, it may be determined that a first order resonant frequency of variable geometry turbocharger having 9 nozzle vanes may be excited by a rotational turbocharger speed of 74,000 revolutions per minute (RPM). In such an operating state the tips of the compressor and/or turbine blades may experience high stress. However, it will be appreciated that alternate resonant frequencies may be excited in other operating states. Furthermore, turbochargers having a different configuration may have a first order resonant frequency which is excited by another rotational speed.

In some examples, an exhaust gas recirculation (EGR) system 86 may also be included in the vehicle. In this example, a high pressure EGR loop (i.e. short EGR loop) is depicted. The high pressure EGR loop includes an EGR conduit 87 coupling the exhaust conduit upstream of the turbine to the intake manifold downstream of the compressor. A high pressure EGR valve 88 configured to adjust the amount of exhaust gas passing through EGR conduit 87 may be positioned within the EGR conduit. However, in additional or alternate examples, a low pressure EGR loop may be included in engine 10. The low pressure EGR loop may include a low pressure EGR conduit having a low pressure EGR valve disposed within fluidly coupling a portion of the exhaust downstream of turbine 82 and upstream of compressor 81. Furthermore, if both a high pressure and a low pressure EGR loop are provided, the high and low pressure EGR loops may be fluidly coupled, allowing the streams from the respective EGR conduits to mix prior to introduction into the intake manifold. It will be appreciated that the EGR system may include additional components such as one or more EGR coolers configured to transfer heat away from the EGR system.

The rotational speed and/or acceleration of the turbocharger may be adjusted via various systems and components. For example, the EGR may be adjusted to alter the rotational speed and/or acceleration of the turbocharger. The rotational speed and/or acceleration of the turbocharger may be the rotational speed and/or acceleration of drive-shaft 83, compressor 81, and/or turbine 82. In particular, the EGR valve may be fully or partially opened to reduce the turbocharger speed or fully or partially closed to increase the rotational speed and/or acceleration. Moreover, the air-fuel ratio may be adjusted via adjustment of the throttle and/or fuel injector to alter the rotational speed and/or acceleration of the turbocharger. For example, the amount of fuel injected into the combustion chamber may be increased thereby increasing the exhaust gas pressure and therefore the speed and/or acceleration of the turbocharger. The wastegate and/or variable geometry turbine may also be adjusted to alter the rotational speed and/or acceleration of the turbocharger. Still further in some examples, the geometry of the compressor may be adjusted to alter the rotational speed and/or acceleration of the turbocharger.

It will be appreciated that at least portion of the aforementioned components (e.g. EGR valve, wastegate, variable geometry turbine, variable geometry compressor, throttle, and fuel injector) may be adjusted in conjunction to adjust the rotational speed and/or acceleration of the turbocharger. For example, the EGR valve and the geometry of the turbocharger may be adjusted to adjust the rotational speed and/or acceleration of the turbocharger. However, in other examples, each component may be adjusted independently. Furthermore, it will be appreciated that the speed of the turbocharger may be adjusted while maintaining a desired engine speed and/or load. The aforementioned adjustments may be implemented via controller 12 or another suitable controller.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. In this example VCT is utilized. However, in other examples, alternate valve actuation systems may be used, such as electronic valve actuation (EVA) may be utilized. The position of intake valve 52 and exhaust valve 54 may be determined by position sensors 55 and 57, respectively.

Fuel injector 66 is shown arranged in the combustion chamber 30 in a configuration that provides what is known as direct injection of fuel into the combustion chamber. Fuel injector 66 may inject fuel in proportion to the pulse width of signal FPW received from controller 12 via electronic driver 68. Fuel may be delivered to fuel injector 66 via a fuel delivery system, including a fuel tank and a fuel pump. It will be appreciated that additional components may be included in the fuel delivery system such as a fuel rail coupled to the fuel injector, a high pressure fuel pump, a fuel filter, etc. In some embodiments, combustion chamber 30 may alternatively or additionally include a fuel injector coupled to intake manifold 44 for injecting fuel directly therein, in a manner known as port injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 89 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

The rotational speed of the turbocharger may be determined in several different ways. The rotational speed may be determined via a turbocharger speed transducer 124 coupled to compressor 81 and electronically coupled to controller 12. Additionally or alternatively, the rotational speed of the turbocharger may be inferred from measured mass air flow and the compressor pressure ratio, a compressor output pressure, or an intake manifold pressure. The pressure downstream of the compressor may be measured via sensor 126 which is electronically coupled to controller 12.

As described above, FIG. 1 shows only one cylinder of a multi-cylinder engine, and that each cylinder may similarly include its own set of intake/exhaust valves, fuel injector, spark plug, etc.

Figure 2:
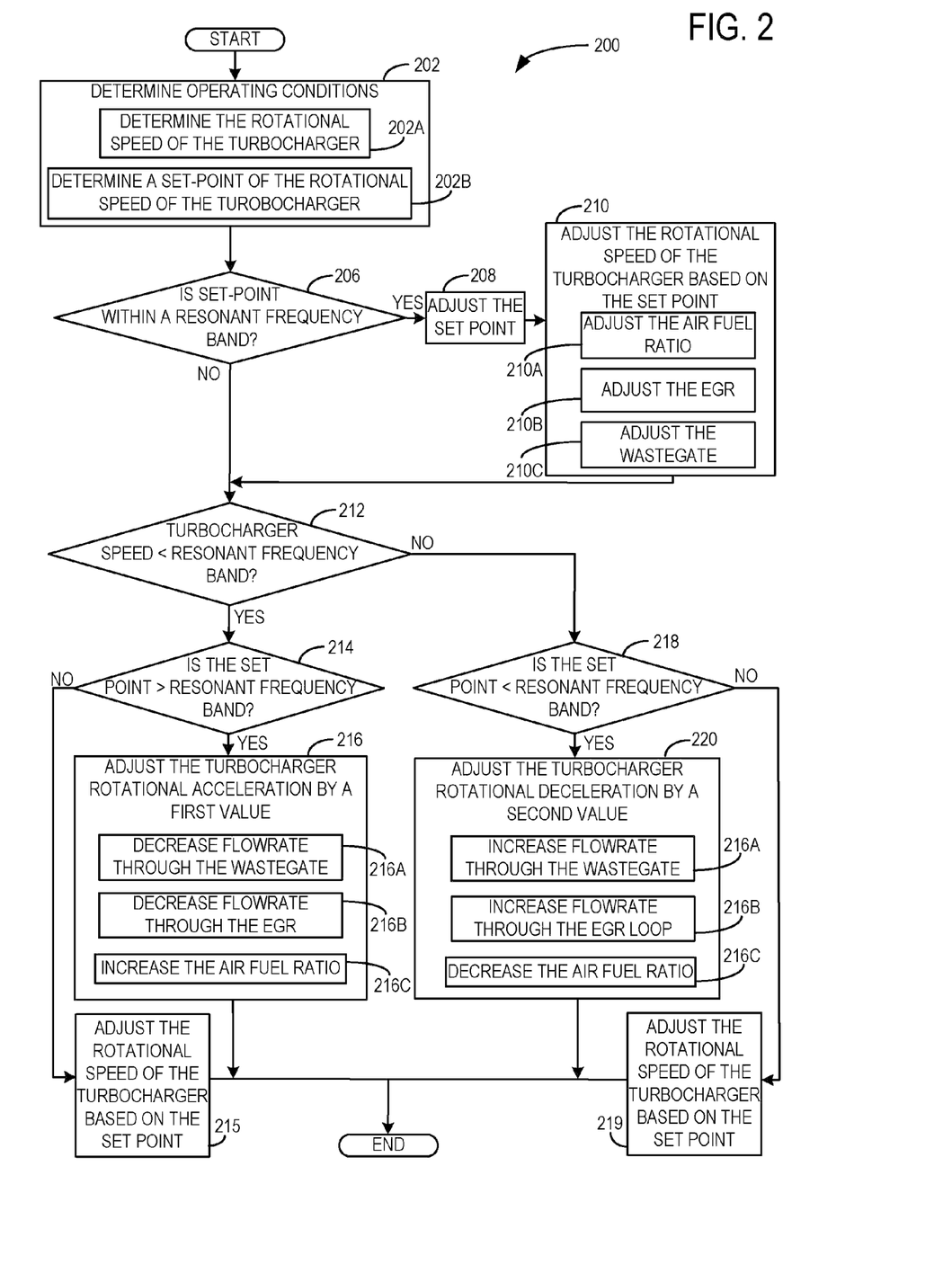
FIG. 2 is a flow chart depicting a control strategy for operation of the turbocharger system.

FIG. 2 depicts an exemplary control strategy 200 for a turbocharger system. The control strategy 200 may be implemented utilizing the system and components discussed above. Alternatively control strategy 200 may be implemented utilizing other suitable systems and components.

In one example, the control strategy may include, during feedback control of the turbocharger speed to a desired, or set-point, speed, adjusting turbocharger rotation acceleration or deceleration in response to one or more resonant frequencies. For example, the control strategy may increase or decrease turbocharger rotational acceleration to reduce an amount of time spent within a resonant frequency speed band. However, the extent to which, and even whether, the turbocharger acceleration and/or deceleration are adjusted can depend on various factors and/or conditions. Further, in some cases the control strategy may operate to adjust acceleration, while in others it may operate to adjust deceleration. For example, the control strategy may increase turbocharger rotation acceleration in response to one or more resonant frequencies during a first condition (e.g., a lower turbocharger speed), and increase turbocharger deceleration in response to one or more resonant frequencies during a second condition (e.g., a higher turbocharger speed), the second condition different from the first condition. In one example, the rate of acceleration and/or deceleration may be adjusted, where during the first condition turbocharger rotation is accelerated at a first increased rate of change of turbocharger speed in response to a first resonant frequency band, and turbocharger rotation is accelerated at a second increased rate of change of turbocharger speed in response to a second resonant frequency band, the increase of the second rate of change greater than the first rate of change, the second frequency band wider than the first frequency band.

In still other examples, the control strategy may operate to increase turbocharger acceleration a first amount in response to one or more resonant frequencies during a first condition (e.g. when turbocharger speed is increasing), and increase turbocharger acceleration a second amount response to one or more resonant frequencies during a second condition (e.g., when turbocharger speed is decreasing). Likewise, the control strategy may operate to increase turbocharger deceleration a first amount in response to one or more resonant frequencies during a first condition (e.g., when turbocharger speed is increasing), and increase turbocharger deceleration a second amount response to one or more resonant frequencies during a second condition (e.g., when turbocharger speed is decreasing).

In still further example, the control strategy may operate to increase turbocharger rotation acceleration or deceleration in response to turbocharger speed falling within one or more resonant frequency bands, where an amount of the increase in acceleration or deceleration is based on a turbocharger speed, whether turbocharger speed is increasing or decreasing, a width of the resonant frequency band within which the turbocharger speed falls, and based on a rate of change of turbocharger speed upon entering the band.

In this way, it may be possible to, for example, decrease turbocharger speed when turbocharger speed is in one or more resonant frequency bands to reduce excitation of the one or more resonant frequencies; and during a different condition, increase turbocharger speed when turbocharger speed is in the one or more resonant frequency bands to reduce excitation of the one or more resonant frequencies.

Returning to FIG. 2, at 202 the operating conditions within the vehicle and engine are determined. Determining the operating conditions may include at 202A determining the rotational speed of the turbocharger and at 202B determining the set-point of the rotational speed of the turbocharger. 202B may include measuring turbocharger speed or estimating turbocharger speed based on various parameters, such as exhaust gas flow, waste gate position, etc. Furthermore, in some examples, the rotational acceleration of the turbocharger may be determined at 202. The set-point for the desired rotational speed may be based on various factors, such as engine speed and load, desired engine torque, regeneration of exhaust emission control devices, and various others. Further, the desired set-point of the turbocharger speed may be limited to be below a maximum turbocharger speed above which the turbocharger and/or related components may fatigue and degrade. As discussed further below, the actual turbocharger speed may be adjusted to follow, or track, the set-point; however, due to various factors and feedback control limitations, the actual speed may deviate, particularly during transients, from the set-point.

It will be appreciated that the turbocharger may operate in a plurality of conditions and the conditions may include various constraints. The operating conditions are discussed in greater detail herein.

From 202, the control strategy advances to 206 where it is determined if the set-point is within a resonant frequency band. A resonant frequency band may include a frequency band which excites oscillation of the turbocharger system, and different resonant bands may be present at different frequencies, and have different widths, for example. In some examples, the frequency band may excite oscillations having amplitudes greater than a threshold value. The resonant frequency band may be symmetric about a resonant frequency, in some examples. Further, in some examples, the resonant frequency may be a first order resonant frequency. In other examples, it may be determined if the actual turbocharger speed is within the resonant frequency band, if the turbocharger speed is approaching the resonant frequency band or the resonant frequency, or if the rotational acceleration or speed of the turbocharger has exceeded a threshold value. In still other examples, it may be determined if a request for adjustment of the rotational speed and/or acceleration of the turbocharger has been made to avoid a resonant frequency.

If the set-point is within the resonant frequency band (YES at 206) the control strategy proceeds to 208 where the set-point is adjusted (e.g. increased or decreased) and to 210 where the rotational acceleration of the turbocharger is adjusted based on the adjustment of the set-point. Adjustment of the rotational of the turbocharger may include adjusting the air-fuel ratio at 210A, adjusting the EGR at 210B, and/or adjusting the wastegate and/or variable geometry turbine at 210C. Further feedback control adjustments may also be used, such as adjusting a turbocharger compressor bypass. From 210, the routine continues to 212 where it is determined if the turbocharger's speed is less than the resonant frequency band. Otherwise, (NO at 206) the control strategy proceeds directly to 212. In this way, the turbocharger speed set-point may avoid resonant frequency bands, and thus the turbocharger may reduce operation within the resonant frequency bands.

If the turbocharger's speed is less than the resonant frequency band (YES 212) the control strategy advances to 214 where it is determined if the set-point is greater than the resonant frequency band. If the set-point is greater than the resonant frequency band (YES at 214) the control strategy proceeds to 216 where the rotational acceleration of the turbocharger is adjusted (e.g. increased) by a first value. In this way, if the turbocharger is to pass through a resistant frequency band, the rotational acceleration of the turbocharger may be increased in response to a resonant frequency during a first condition, thereby reducing a residence time in which the turbocharger is operating within a resonant frequency band. The first condition may include an operating state in which the set-point is not substantially equal to the actual rotational speed of the turbocharger, the set-point is not within the resonant frequency band, the rotational speed of the turbocharger is less than the resonant frequency band, and the set-point is greater than the resonant frequency band. However, it will be appreciated that additional or alternate constraints may be included in the first operating condition. Adjustment of the acceleration of the turbocharger may include decreasing the flow-rate through the wastegate and/or variable geometry turbine at 216A, decreasing the flow-rate through the EGR at 216B, and/or increasing the air-fuel ratio at 216C. Further in some examples, adjustment of the acceleration of the turbocharger may include adjusting the geometry of the compressor if such mechanism is present (e.g. increasing the aspect ratio).

However, if the set-point is not greater than the resonant frequency band (NO at 214) then the control strategy proceeds to 215 where the rotational speed of the turbocharger is adjusted based on the set-point. As previously discussed, adjustment of the rotational speed of the turbocharger may include adjusting the air-fuel ratio, adjusting the EGR system, adjusting the wastegate, and/or variable geometry turbine, and/or adjusting the geometry of the compressor. After 215 the control strategy ends. On the other hand, if the turbocharger speed is not less than the resonant frequency band (NO at 212) the control strategy advances to 218 where it is determined if the set-point is less than the resonant frequency band. If the set-point is less than the resonant frequency band (YES at 218), the control strategy advances to 220 where the deceleration of the turbocharger is adjusted (e.g. increased) by a second value. In this way, the rotational deceleration of the turbocharger may be increased in response to a resonant frequency band during a second condition, the first and second conditions different from the first condition. In this example, the second value is not equal to the first. In particular, the first value may be greater than the second value. However, in other examples the first and the second values may be equal. In this way, the residency time in which the turbocharger is operating within a resonant frequency band may be reduced while the speed of the turbocharger is decreasing, thereby decreasing the fatigue on the components of the turbocharger. The second condition may include an operating state in which the set-point is not substantially equal to the actual rotational speed of the turbocharger, the set-point is not within the resonant frequency band, the rotational speed of the turbocharger is greater than the resonant frequency band, and the set-point is less than the resonant frequency band. However, it will be appreciated that alternate or additional constraints may be included in the second condition.

Adjusting the acceleration of the turbocharger may include increasing the flow-rate through the wastegate and/or variable geometry turbine at 220A, increasing the flow-rate through the EGR loop at 220B, and/or decreasing the air-fuel ratio at 220C. Further in some examples, adjustment of the acceleration of the turbocharger may include adjusting the geometry of the compressor (e.g. decreasing the aspect ratio). After 220 the control strategy ends. However, if the set-point not less than the resonant frequency band (NO at 218) the control strategy proceeds to 219 where the rotational speed of the turbocharger is adjusted based on the set-point. As previously discussed adjustment of the rotational speed of the turbocharger may include adjusting the air-fuel ratio, adjusting the EGR system, adjusting the wastegate, variable geometry turbine, and/or adjusting the geometry of the compressor.

As noted herein, the rotational acceleration or deceleration may be temporarily increased, allowing the turbocharger to rapidly pass through the resonant frequency band, decreasing the residency time in which the turbocharger is operating in the resonant frequency band. It will be appreciated that the acceleration and deceleration may be increased by different values depending on the operating conditions within the engine. In other examples, the rotation acceleration or deceleration may be decreased to prevent the turbocharger from entering the resonant frequency band. Further in some examples, adjustment of the rotational acceleration of the turbocharger may include adjusting the geometry of the turbine and/or wastegate. Still further in some examples, the adjustment of the acceleration or deceleration may be implemented while maintaining a desired engine speed and/or load.

It will be appreciated that control strategy 200 may be implemented for a plurality of different resonant frequency bands (e.g. a first order resonant frequency band, a second order resonant frequency band, etc.). In some examples, the range of the frequency band may be adjusted based on the severity of the oscillation caused by the excitation. For example, a first order frequency band may have a greater width than a second order frequency band or visa-versa. Moreover, the first resonant frequency bands may have different values. That is to say that the median value, lower bound, upper bound, etc., of a first resonant frequency band may be less than a median value, lower bound, upper bound, etc., of a second resonant frequency band or visa-versa. Furthermore, the increase in acceleration or deceleration through each frequency band may not be equivalent. For example, the increase in acceleration or deceleration may depend on the severity of oscillation caused by the resonant frequency band, the width of the resonant frequency band, etc.

Figure 3:
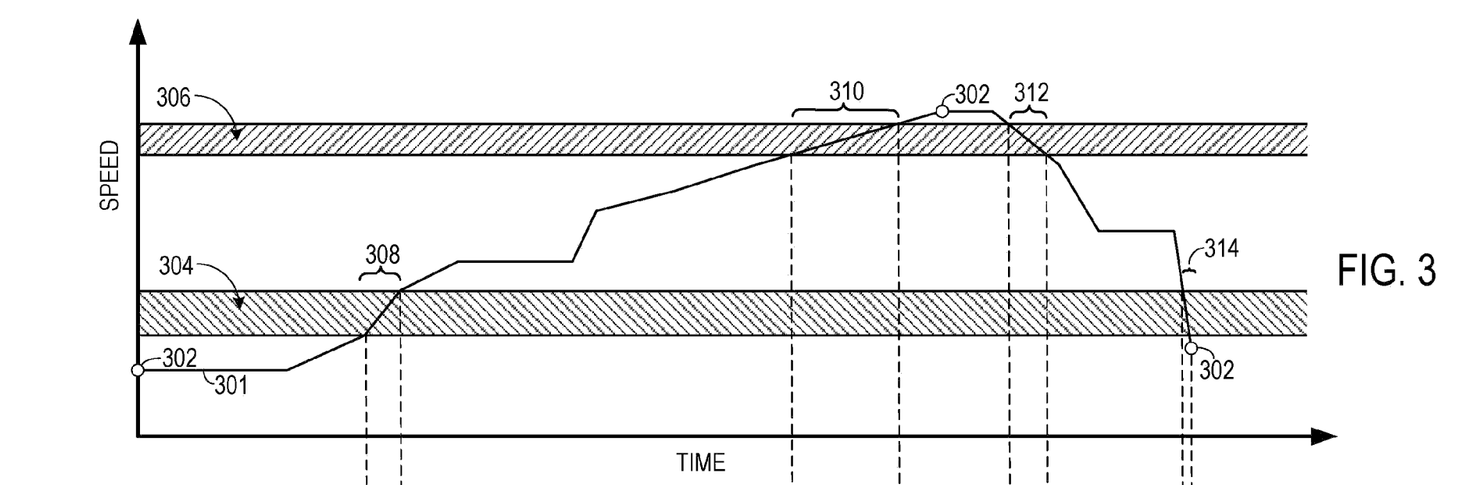
FIGS. 3 and 4 show graphs depicting an exemplary operation of the turbocharger system.
Figure 4:
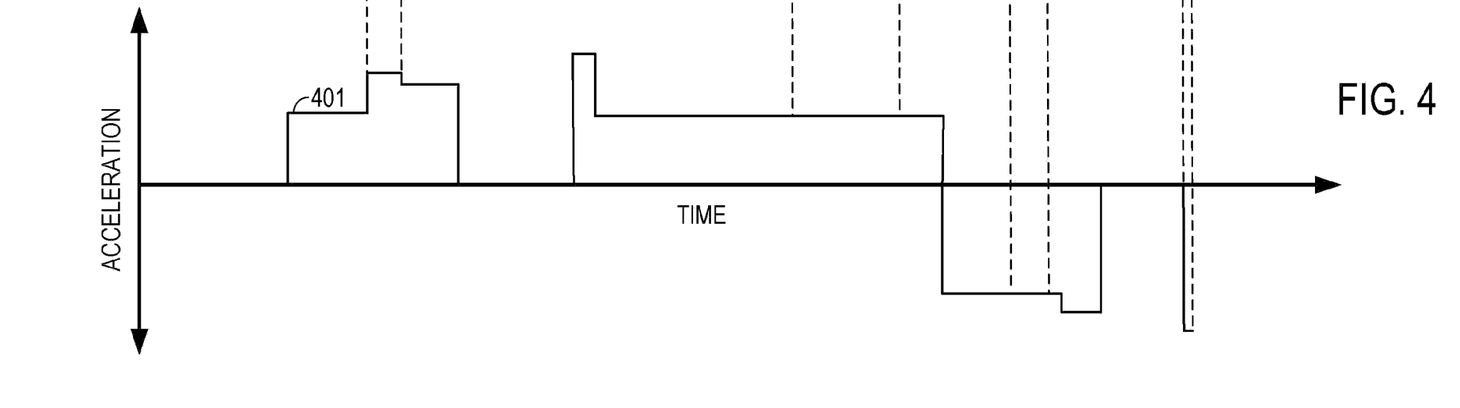

FIGS. 3 and 4 show graphs illustrating an exemplary operation of a turbocharger system based on control strategy 200, illustrated in FIG. 2. In FIG. 3 time is on the x-axis and the turbocharger's speed {e.g. revolution per minute (RPM)} is on the y-axis. As discussed above the rotational speed of the turbocharger may correspond to the rotational speed of the turbine, compressor, or drive-shaft. In FIG. 4 time is on the x-axis and the turbocharger's rotational acceleration is on the y-axis.

Line 301 depicts the path of the turbocharger's rotational speed over time. Likewise, line 401 depicts the path of the turbocharger's rotational acceleration over time. A first resonant frequency band 304 may have a first range and a second resonant frequency band 306 may have a second range. In this example, the ranges are not equivalent in width. That is to say that the differences between upper and lower values of each range may not be equal. In particular, the width of the first frequency band is greater than the range of the second frequency band. However, in other examples the widths are equal.

Initially the turbocharger set-point 302 may be at a first speed. Subsequently the turbocharger set-point 302 may be increased to a second speed. Thus, the speed of the turbocharger may pass through the first resonant frequency band over time interval 308 and the second frequency band over time interval 310 as the speed of the turbocharger is increasing. As depicted in FIG. 4, the acceleration of the turbocharger through the first resonant frequency band may be greater than the acceleration through the second frequency band. It will be appreciated that magnitude of the acceleration through both the first and second frequency bands may be increased when compared to previous values set by a controller or control system. In this way, the residency time of the turbocharger's rotational speed in both the first and second resonant frequency bands may be reduced. It will be appreciated that the severity (e.g. amplitude) of the oscillations excited within the first frequency band may be greater than the severity of the oscillations excited in the second frequency band. Therefore, the duration during which the turbocharger can operate within the second frequency band may be greater than the duration during which the turbocharger can operate within the first frequency band while the speed of the turbocharger is increasing.

Next, set-point 302 may be decreased and therefore the speed of the turbocharger may pass through the first resonant frequency band over time interval 312 and the second frequency band over time interval 314 as the speed of the turbocharger is decreasing. As depicted in FIG. 4, the deceleration of the turbocharger through the first resonant frequency band 304 may be greater than the deceleration through the second frequency band 306. It will be appreciated that magnitude of the deceleration through both the first and second frequency bands may be increased when compared to previous values set by the controller or control system. In this way, the residency time of the turbocharger's rotational speed in both the first and second resonant frequency bands may be reduced while the speed of the turbocharger is decreasing. As depicted, the magnitude of the deceleration while the turbocharger is operating within the first resonant frequency band may not be equal to (e.g. less than) the magnitude of acceleration while the turbocharger is operating within the first frequency band. Likewise, the magnitude of the deceleration while the turbocharger is operating within the second resonant frequency band may not be equal (e.g. greater than) to the magnitude of acceleration while the turbocharger is operating within the second frequency band. In this way, the acceleration or deceleration may be adjusted based on different characteristics of the turbocharger. However, it will be appreciated that the magnitude of acceleration or deceleration while the turbocharger is operating in a resonant frequency band may be substantially equivalent, in other examples.

The systems and methods described above prevent extended operation of the turbocharger in one or more resonant frequency bands, thereby decreasing the amplitude and/or number of oscillation experienced by the turbocharger due to excitation of the resonant frequencies. Thus, the longevity of the turbocharger may be increased and potential catastrophic failure of the turbocharger may be avoided, increasing the reliability of the engine.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, the temporarily increase or decrease in turbocharger rotation acceleration and/or deceleration when passing through a resonant frequency band may affect engine speed, engine airflow, engine air/fuel ratio, engine torque, etc. As such, various countermeasures may be taken by the control system to counteract these affects, such as temporarily adjusting throttle position (e.g., temporarily decreasing throttle position) during, and contemporaneously with, temporarily increasing turbocharger acceleration, or vice versa. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operation of an engine including a turbocharger, comprising:
    adjusting turbocharger shaft rotation acceleration or deceleration in response to turbocharger speed operation within a turbocharger resonant frequency band via a controller;
    increasing turbocharger shaft rotation acceleration in response to operation within the turbocharger resonant frequency band during a first condition, and increasing turbocharger shaft rotation deceleration in response to operation within a second resonant frequency band during a second condition, the second condition different from the first condition, wherein during the first condition, turbocharger shaft rotation is accelerated at a first increased rate of change of turbocharger shaft speed in response to operation within the turbocharger resonant frequency band, and turbocharger shaft rotation is decelerated at a second increased rate of change of turbocharger shaft speed during the second condition in response to operation within the second resonant frequency band, the increase of the second rate of change greater than the first rate of change, the second frequency band wider than the first frequency band; and
    adjusting an air-fuel ratio via adjustment of a throttle and/or fuel injector to adjust the turbocharger shaft rotation acceleration or deceleration.

2. The method of claim 1 wherein turbocharger shaft rotation acceleration or deceleration is further adjusted by adjusting a turbocharger wastegate.

3. The method of claim 1 wherein turbocharger shaft rotation acceleration or deceleration is further adjusted by a variable geometry turbine.

4. The method of claim 1 wherein turbocharger shaft rotation acceleration or deceleration is further adjusted by adjusting a high pressure and/or low pressure EGR valve.

5. The method of claim 1 wherein turbocharger shaft rotation acceleration or deceleration is further adjusted by adjusting a geometry of a compressor.

6. An engine method, comprising:
    via non-transitory computer-readable storage medium on a controller:
        in a first condition, increasing a turbocharger shaft acceleration a first amount while a turbocharger operates in a resonant frequency band to reduce a residency time in the resonant frequency band responsive to turbocharger shaft speed increasing;
        in a second condition, increasing turbocharger shaft deceleration a second amount, different from the first amount, while the turbocharger operates in the resonant frequency band to reduce the residency time in the resonant frequency band responsive to the turbocharger shaft speed decreasing; and
        adjusting an air-fuel ratio via adjustment of a throttle and/or fuel injector to increase the turbocharger shaft acceleration or deceleration.

7. An engine method, comprising:
    via non-transitory computer-readable storage medium on a controller:
        traversing a first resonant frequency band at a first rate of change responsive to turbocharger shaft speed increasing, and traversing a second resonant frequency band at a second rate of change responsive to turbocharger shaft speed decreasing, wherein the first resonant frequency band is at a higher speed, and the second resonant frequency band is at a lower speed, and the first rate of change is lower than the second rate of change; and
        adjusting an air-fuel ratio via adjustment of a throttle and/or fuel injector to alter rotational speed and/or acceleration of a turbocharger in order to traverse the first resonant frequency band at the first rate of change or traverse the second resonant frequency band at the second rate of change.

8. The method of claim 7 further comprising, via the controller, traversing the first resonant frequency band at a third rate of change responsive to turbocharger shaft speed decreasing, wherein the third rate of change is intermediate to the first and second rates of change.

* * * * *